United States Patent
Nishimura et al.

(10) Patent No.: US 7,952,309 B2
(45) Date of Patent: May 31, 2011

(54) ROTATING ELECTRICAL MACHINE CONTROL DEVICE

(75) Inventors: Keisuke Nishimura, Anjyo (JP); Masuho Sakakibara, Obu (JP); Yoshinari Nakagawa, Isshiki (JP); Yoshinori Oono, Kota (JP)

(73) Assignee: Aisin A W Co., Ltd., Anjo (JP)

( * ) Notice: Subject to any disclaimer, the term of this patent is extended or adjusted under 35 U.S.C. 154(b) by 381 days.

(21) Appl. No.: 12/318,842

(22) Filed: Jan. 9, 2009

(65) Prior Publication Data

US 2009/0195197 A1  Aug. 6, 2009

(30) Foreign Application Priority Data

Jan. 31, 2008  (JP) ................................. 2008-020752

(51) Int. Cl.
   *H02K 29/06* (2006.01)
   *H02P 6/00* (2006.01)

(52) U.S. Cl. ......... 318/400.24; 318/400.14; 318/400.15; 318/400.23; 318/432; 318/599; 363/41; 363/45; 363/34; 363/74; 363/132; 324/207.25; 324/207.11; 323/217; 323/219; 323/212; 323/223; 323/265; 323/311; 323/349

(58) Field of Classification Search .................. 318/432, 318/400.14, 400.15, 599, 400.23, 400.24; 363/41, 45, 132, 34, 74, 109; 324/207.25, 324/207.11; 323/217, 219, 212, 223, 265, 311, 349; 341/15

See application file for complete search history.

(56) References Cited

U.S. PATENT DOCUMENTS

| | | | | |
|---|---|---|---|---|
| 4,641,075 | A * | 2/1987 | Asano et al. .................. | 318/811 |
| 4,847,743 | A * | 7/1989 | Kamiyama ..................... | 363/41 |
| 5,614,803 | A * | 3/1997 | Morioka et al. ............... | 318/801 |
| 5,883,484 | A | 3/1999 | Akao | |
| 6,751,105 | B2 | 6/2004 | Yamanaka et al. | |
| 7,638,983 | B2 * | 12/2009 | Park et al. ........................ | 322/20 |
| 7,781,999 | B2 * | 8/2010 | Amano ....................... | 318/400.3 |

FOREIGN PATENT DOCUMENTS

| | | |
|---|---|---|
| JP | A-63-290170 | 11/1988 |
| JP | A-8-23698 | 1/1996 |
| JP | A-10-66383 | 3/1998 |
| JP | A-2004-364460 | 12/2004 |
| JP | A-2007-110781 | 4/2007 |
| JP | A-2007-151344 | 6/2007 |
| JP | A-2007-202311 | 8/2007 |
| WO | WO 01/65675 A1 | 9/2001 |

* cited by examiner

*Primary Examiner* — Rita Leykin
(74) *Attorney, Agent, or Firm* — Oliff & Berridge, PLC

(57) ABSTRACT

A rotating electrical machine control device includes an inverter; a resolver; a unit; a three-phase/two-phase modulation switching unit; and a motor control unit that switches to a two-phase modulation in a specific region where an electric noise given to the resolver by a rotating electrical machine is large, even in a region where the modulation ratio is smaller than the three-phase/two-phase modulation switching boundary.

10 Claims, 9 Drawing Sheets

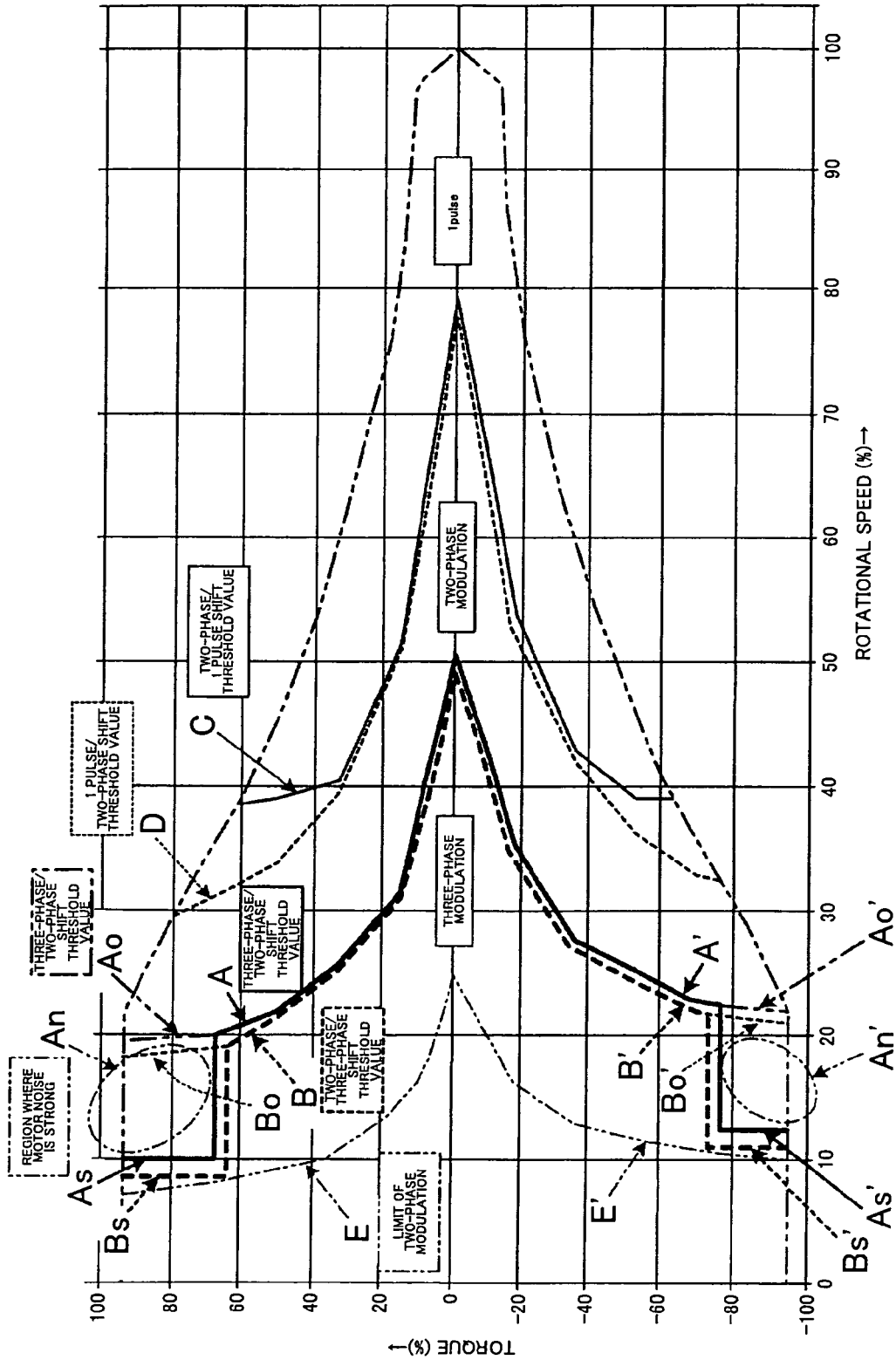

ROTATING ELECTRICAL MACHINE CONTROL DEVICE

CROSS-REFERENCE TO RELATED APPLICATION

The disclosure of Japanese Patent Application No. 2008-020752 filed on Jan. 31, 2008 including the specification, drawings and abstract is incorporated herein by reference in its entirety.

BACKGROUND

The present invention relates to a rotating electrical machine control device.

In a three-phase modulation mode of a three-phase inverter in which a three-phase alternating current is generated and applied to respective phases coils of a three-phase alternating current rotating electrical machine by three-phase PWM switching, there is a high switching loss in electric power since the PWM switching is performed with respect to three phases, and the switching to a two-phase modulation mode from the three-phase modulation mode is performed in an operation region where a current distortion by a two-phase modulation is small (for example, see Japanese Patent No. 3844060). Note that the two-phase modulation mode is executed by stopping the PWM switching for forming a sine wave in one phase to obtain a continuous high level or low level in a half wave interval and sequentially switching the phases.

In a rotating electrical machine control using a vector control, it is necessary to detect a rotation angle (magnetic pole position) q of an electric motor in order to perform a feedback of the operation state of the electric motor to the vector control. Japanese Patent Application Publication No. JP-A-2007-151344 describes a sensor less motor control that estimates and calculates the magnetic pole position based on a motor current, extracts a high frequency component of the motor current to calculate a magnetic pole position correction amount based thereon, and corrects the magnetic pole position. There are also embodiments in which the magnetic pole position is detected by connecting a rotary encoder or a resolver to an electric motor.

In the resolver, a rotor having a winding that is excited by a high frequency current is driven to rotate by the electric motor, and a voltage induced in a stator winding and having an excited current frequency is increased/decreased (modulated) by the rotation of the rotor. This is passed through a high-pass filter (demodulated) to output a sine wave (or a cosine wave) showing the rotation of the rotor as a rotation detection signal showing the rotation angle and the rotational speed of the electric motor. The phase of the rotation detection signal corresponds to the rotation angle (electric angle $\theta$) of the electric motor, and the frequency is proportional to a rotational speed w of the electric motor. From the rotation detection signal, the rotation angle $\theta$ and the rotational speed $\omega$ of the electric motor can be calculated by an angle/speed calculation.

Note that Japanese Patent Application Publication No. JP-A-10-66383 describes a motor drive control device including a boost circuit that omits a weak field control in order to eliminate electric loss or a decrease in system efficiency due to the weak field control and increases the operation voltage applied to an inverter, in which electricity is supplied from the boost circuit to the inverter when a battery voltage is insufficient with respect to a target operation of the motor. Japanese Patent No. 3746334 describes a motor drive control device including a boost circuit, which increases a battery voltage, in which the boost circuit is controlled such that a required boost voltage corresponding to a target operation and speed electromotive force of a motor is calculated to realize the boost voltage.

SUMMARY

A resolver is arranged in or in the vicinity of an electric motor, and therefore is easily influenced by electric noise, i.e., high frequency noise, generated by the electric motor. When the high frequency noise generated by the electric motor is applied to a stator winding or a signal processing circuit of the resolver or an output lead wire, a rotation detection signal of the resolver may be disturbed. In the case of a wheel drive motor, there is a high possibility of the rotation detection signal of the resolver being disturbed since the energized current is large and the switching noise thereof is strong.

When the waveform of the rotation detection signal (sine wave or cosine wave) of the resolver is deformed by the application of noise, the rotation angle detection value q of the electric motor becomes an error, and the electric motor cannot be controlled accurately by a vector control. Particularly in the three-phase modulation mode, there is a high possibility of the rotation detection signal of the resolver being disturbed by an increase of electromagnetic noise due to an increase in the high frequency component of current when the output of torque (current) is high, since an inverter is switched frequently. In the three-phase modulation mode, since a secondary side voltage (output voltage) of a converter (boost circuit) is increased when the rotational speed increases, an inverter voltage is increased to increase an electric field noise generated by the switching of the inverter. Thus, there is a high possibility of the rotation detection signal of the resolver being disturbed.

It is an object of the present invention to prevent a drive control error of a rotating electrical machine. Specifically, it is an object to reduce the disturbance of a rotation detection signal of a resolver due to electric noise, in other words, to reduce the disturbance of the drive control of the rotating electrical machine due to the disturbance of the rotation detection signal. The present invention can also achieve various other advantages.

According to an exemplary aspect of the invention, a target torque, rotational speed, and rotation angle of a rotating electrical machine are used to control an inverter such that an output torque of the rotating electrical machine becomes the target torque, and a three-phase/two-phase modulation of switching the control of the inverter from three-phase modulation to two-phase modulation is performed when a modulation ratio, which is the ratio of a voltage applied to the rotating electrical machine with respect to a voltage input to the inverter, becomes greater than a three-phase/two-phase modulation switching boundary, but it is switched to the two-phase modulation in a specific region (An) where electric noise given to a resolver by the rotating electrical machine is large, even in a region where the modulation ratio is smaller than the three-phase/two-phase modulation switching boundary.

According to an exemplary aspect of the invention, a rotating electrical machine control device includes an inverter that performs electric power conversion between a primary side DC power supply and a rotating electrical machine; a resolver that generates a rotation detection signal corresponding to a rotation angle of the rotating electrical machine; a unit that calculates the rotation angle and a rotational speed based on the rotation detection signal; a three-phase/two-phase modulation switching unit that uses a target torque, the rotational speed and the rotation angle of the rotating electrical machine in order to control the inverter such that an output torque of the rotating electrical machine becomes the target torque and switches a control of the inverter from three-phase modulation to two-phase modulation when a modulation ratio, which is a ratio of a voltage applied to the rotating electrical machine with respect to a voltage input to the inverter, becomes greater than a three-phase/two-phase modulation switching boundary; and a motor control unit that switches to the two-phase modulation in a specific region where an electric noise given to the resolver by the rotating electrical machine is large, even in a region where the modulation ratio is smaller than the three-phase/two-phase modulation switching boundary.

BRIEF DESCRIPTION OF THE DRAWINGS

Various exemplary aspects of the invention will be described with reference to the drawings, wherein:

FIG. 9 is a graph showing a modulation region division of an electric motor.

DETAILED DESCRIPTION OF EMBODIMENTS

Other purposes and features of an embodiment of the present invention shall become clear from the description below of an embodiment with reference to the drawings.

First Embodiment

Figure 1:
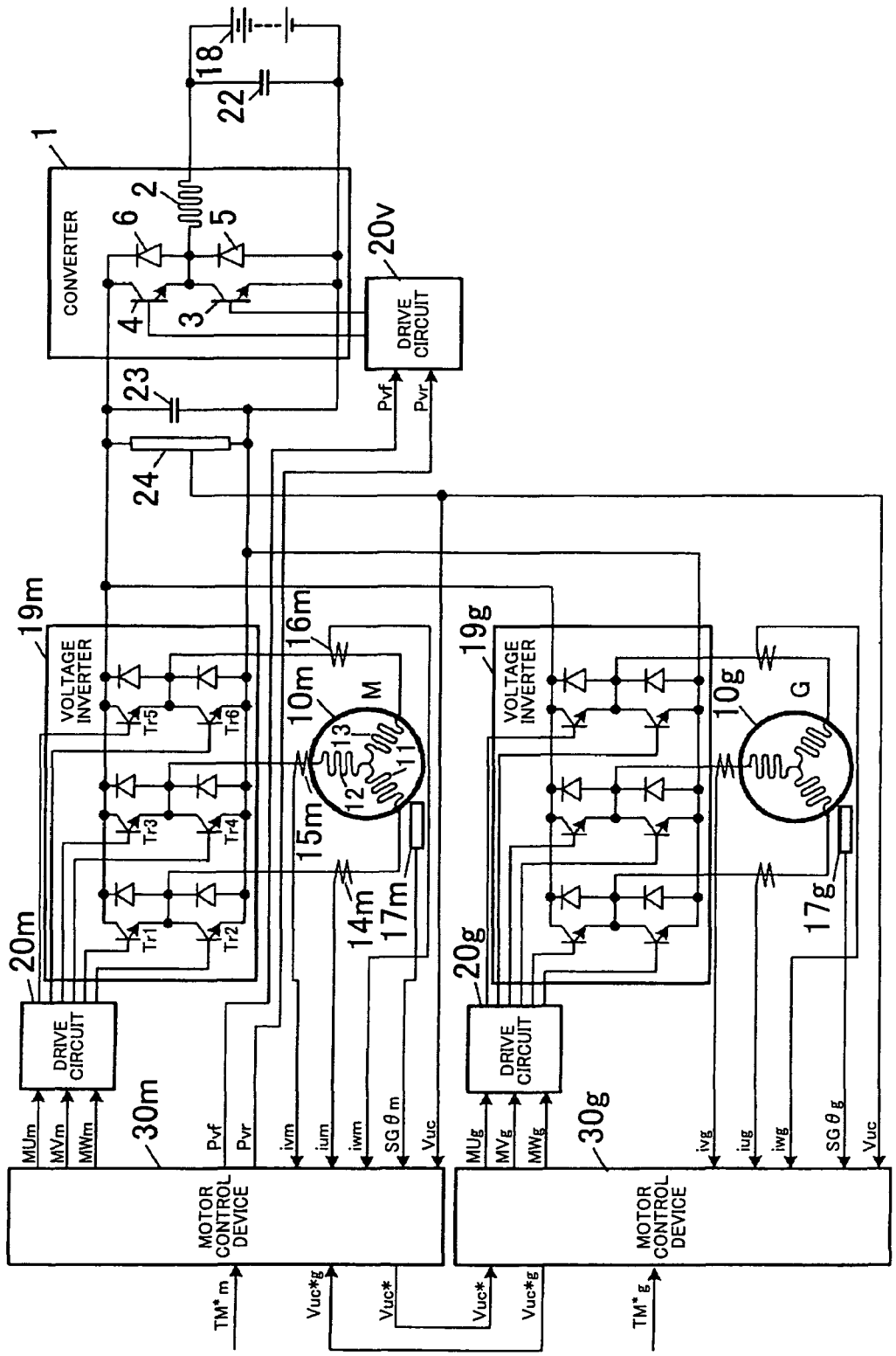
FIG. 1 is a block diagram showing the outline of the configuration of a first embodiment of the present invention.

FIG. 1 shows the outline of a first embodiment of the present invention. In this embodiment, an electric motor $10m$ as a first rotating electrical machine subjected to control is a permanent magnet type synchronous electric motor mounted to a vehicle to drive and rotate a wheel, in which a rotor incorporates a permanent magnet and a stator has three-phase coils 11 to 13 of a U-phase, a V-phase, and a W-phase. A voltage inverter $19m$ as a first inverter supplies the electric power of a battery 18 on the vehicle to the electric motor $10m$. A rotor of a first resolver $17m$ for detecting the magnetic pole position of the rotor is connected to the rotor of the electric motor $10m$. The resolver $17m$ generates an analog voltage (rotation angle signal) SG $\theta m$ showing the rotation angle of the rotor to be provided to a motor control device $30m$.

A primary side capacitor 22 is connected to the battery 18 as a storage battery on the vehicle when the power supply of an electric component portion on the vehicle is turned on to form a primary side power supply together with the battery 18. One end of a reactor 2 of a two-way converter circuit 1 is connected to a positive terminal (positive line) of the primary side power supply.

The converter circuit 1 further has a boost switching element 3 which connects/disconnects the other end of the reactor 2 and a negative terminal (negative line) of the primary side power supply, a buck switching element 4 which connects/disconnects a positive terminal of a secondary side capacitor 23 and the other end, and respective diodes 5 and 6 connected to the respective switching elements 3 and 4 in parallel. An anode of the diode 5 is connected to the other end of the reactor 2 and a cathode is connected to the negative terminal (negative line) of the primary side power supply. An anode of the diode 6 is connected to the positive terminal of the secondary side capacitor 23 and a cathode is connected to the other end of the reactor 2. For both of the switching elements 3 and 4, an insulated gate bipolar transistor (IGBT) is used in this embodiment.

When the boost switching element 3 is turned on (energized), current flows in the boost switching element 3 from the primary side power supply (18, 22) via the reactor 2 to thereby charge the reactor 2. When the boost switching element 3 is switched off (deenergized), the reactor 2 performs a high-voltage discharge to the secondary side capacitor 23 via the diode 6. That is, a voltage higher than the voltage of the primary side power supply is induced to charge the secondary side capacitor 23. By repeating the on/off of the boost switching element 3, the high-voltage charge of the secondary side capacitor 23 continues. That is, the secondary side capacitor 23 is charged with a high voltage. Since the electric power accumulated in the reactor 2 increases according to the length of the on-period when the on/off is repeated in a certain cycle, the rate of electricity supply (electricity supply rate for power running) to the secondary side capacitor 23 from the primary side power supply 18 and 22 via the converter circuit 1 can be adjusted by adjusting the on-time during the certain cycle (on-duty: ratio of on-time with respect to the certain cycle), i.e., by a PWM control.

When the buck switching element 4 is turned on (energized), the stored electric power of the secondary side capacitor 23 is provided to the primary side power supply 18 and 22 via the buck switching element 4 and the reactor 2 (a reverse electricity supply: regeneration). In this case as well, the rate of the reverse electricity supply (electricity supply rate for regeneration) from the secondary side capacitor 23 to the primary side power supply 18 and 22 via the converter circuit 1 can be adjusted by adjusting the on-time of the buck switching element 4 during the certain cycle, i.e., by the PWM control.

The voltage inverter $19m$ includes six switching transistors Tr1 to Tr6. By turning on (energizing) and driving the transistors Tr1 to Tr6 with each of six drive signals generated in parallel by a drive circuit $20m$, a DC voltage of the secondary side capacitor 23 (output voltage of the converter circuit 1, i.e., the secondary side voltage) is converted to three AC voltages having phase differences of $2\pi/3$, i.e., a three-phase AC voltage, to be respectively applied to the stator coils 11 to 13 of three phases (U-phase, V-phase, and W-phase) of the electric motor $10m$. Accordingly, respective phase currents iUm, iVm, and iWm flow in the stator coils 11 to 13 of the electric motor $10m$ to rotate the rotor of the electric motor $10m$. The six switching transistors Tr1 to Tr6 are all IGBTs.

In order to increase the electric power supply performance with respect to the on/off driving (switching) of the transistors Tr1 to Tr6 by PWM pulses and to suppress a voltage surge, the secondary side capacitor 23 having a large capacity is connected to a secondary side output line of the converter circuit 1 which is the input line of the inverter 19m. In contrast, the primary side capacitor 22 forming the primary side power supply is small in size, low in cost, and small in capacity. The capacity of the primary side capacitor 22 is considerably smaller than the capacity of the secondary side capacitor 23. A secondary side voltage Vuc of the converter circuit 1 is detected and provided to a converter control device 30v by a voltage sensor 24. Electric supply lines connected to the stator coils 11 to 13 of the electric motor 10m are mounted with current sensors 14m to 16m using hall ICs to detect the respective phase currents iUm, iVm, and iWm and generate current detection signals (analog voltages) to be provided to the motor control device 30m.

Figure 2:
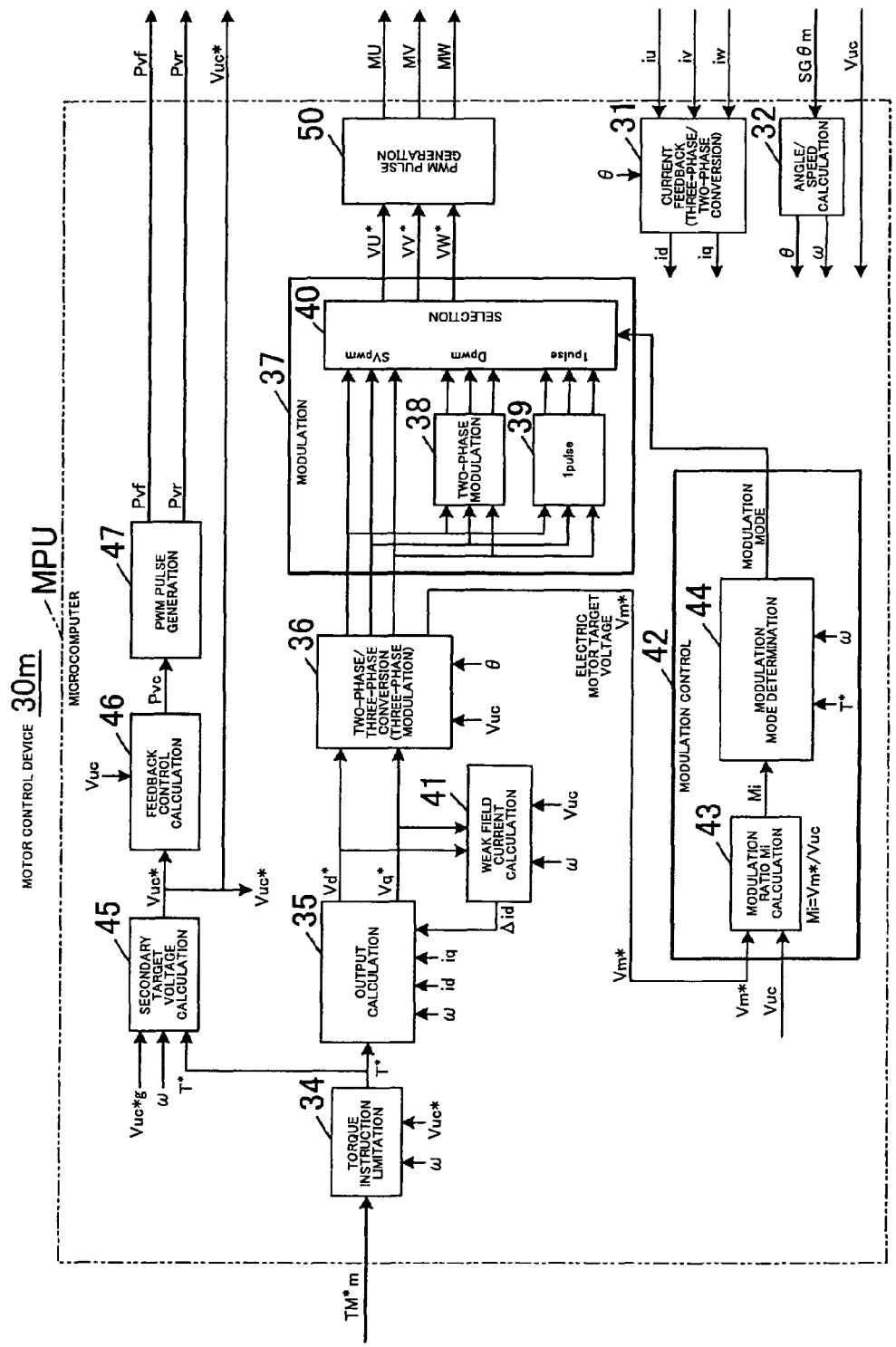
FIG. 2 is a block diagram showing the outline of the functional configuration of a motor control device shown in FIG. 1.

FIG. 2 shows the functional configuration of the first motor control device 30m. In this embodiment, the first motor control device 30m is an electronic control device having a microcomputer MPU as a main body, and includes the microcomputer MPU, the drive circuit 20m, current sensors 14 to 16, an interface (signal processing circuit) (not shown) between a resolver 17 and the secondary side voltage sensor 24, and an interface (communication circuit) (not shown) between the microcomputer MPU and a main controller of a vehicle drive control system (not shown) on the vehicle as well as a motor control device 30g.

Referring to FIG. 2, the microcomputer MPU which is the motor control device 30m calculates a rotation angle (magnetic pole position) θ and a rotational speed (angular speed) ω of the rotor of the electric motor 10m based on the rotation angle signal SG Om provided by the resolver 17m.

Note that, to be accurate, the rotation angle and the magnetic pole position of the rotor of the electric motor 10m are not the same, but the two are in proportional relation in which a proportionality coefficient is determined by the number of magnetic poles p of the electric motor 10m. The rotational speed and the angular speed are not the same, but the two are in proportional relation in which a proportionality coefficient is determined by the number of magnetic poles p of the electric motor 10m. In this description, the rotation angle θ means the magnetic pole position. The rotational speed w means the angular speed, but may mean the rotational speed.

The main controller of the vehicle drive control system (not shown) provides a motor target torque TM* to the motor control device 30m, i.e., the microcomputer MPU. Note that the main controller calculates a vehicle request torque TO* based on the vehicle speed and the accelerator opening of the vehicle, generates the motor target torque TM* in correspondence with the vehicle request torque TO* to be provided to the microcomputer MPU. The microcomputer MPU outputs the rotational speed ω rpm of the electric motor 10m to the main controller.

The microcomputer MPU uses a torque instruction limitation 34 to read a limit torque TM*max corresponding to a secondary side voltage Vuc* and the rotational speed w from a limit torque table (look-up table), and determines the limit torque TM*max as a target torque T* when the target torque TM* exceeds the limit torque TM*max. When less than or equal to the limit torque TM*max, the motor target torque TM* is determined as the target torque T*. The motor target torque T* generated with such limitation is provided to a secondary target voltage calculation 45 and an output calculation 35.

Note that the limit torque table is a memory region in which, with respective values of the secondary side voltage Vuc* and the voltage within the rotational speed as addresses, the maximum torque realizable at each value in the electric motor 10m is written as the limit torque TM*max. In this embodiment, the limit torque table means one memory region in a RAM (not shown) in the microcomputer MPU. The limit torque TM*max increases as the secondary target voltage Vuc* increases, and decreases as the secondary target voltage Vuc* decreases. The limit torque TM*max increases as the rotational speed ω decreases, and decreases as the rotational speed ω increases.

In the microcomputer, there is a nonvolatile memory in which data TM*max of the limit torque table is written. In the process of the microcomputer being applied with the operation voltage to initialize itself and a motor drive system shown in FIG. 1, the microcomputer reads from the nonvolatile memory to write to the RAM. The microcomputer has a plurality of other similar look-up tables referred to later, which also means memory regions on the RAM in which reference data in the nonvolatile memory is written in a similar manner to the limit torque table.

The microcomputer MPU of the motor control device 30m identifies a "power running" or a "regeneration" in the secondary target voltage calculation 45 based on the target torque T* and the rotational speed ω, and reads a first target voltage Vuc*m assigned to the rotational speed ω of the electric motor 10m from a first target voltage table assigned to the target torque T* in the "power running" group in the case of the "power running" and in the "regeneration group" in the case of the "regeneration."

A microcomputer of the other motor control device 30g identifies the "power running" or the "regeneration" by a similar data processing as in the secondary target voltage calculation 45 based on the target torque T* and the rotational speed ω of the an electric motor (electric generator) 10g, and reads a second target voltage Vuc*g assigned to the rotational speed ω of the electric motor 10g from a second target voltage table assigned to the target torque T* in the "power running" group in the case of the "power running" and in the "regeneration group" in the case of the "regeneration." The second target voltage Vuc*g is provided to the microcomputer MPU (FIG. 2).

The secondary target voltage calculation 45 (FIG. 2) of the microcomputer MPU provides the higher one of the first target voltage Vuc*m calculated by itself and the second target voltage Vuc*g provided by the microcomputer of the motor control device 30g as the secondary target voltage Vuc* to be provided to the torque instruction limitation 34 and a feedback control calculation 46.

In the feedback control calculation 46, a control output Pvc for bringing the secondary side voltage Vuc detected by the voltage sensor 24 to the secondary target voltage Vuc* is calculated by a feedback proportional-integral (PI) calculation to be provided to a PWM pulse generation 47. In the pulse generation 47, the control output Pvc is converted to boost (power running) PWM pulses which turn on/off the boost switching element 3 and buck (regeneration) PWM pulses which turn on/off the buck switching element 4 to be output to a drive circuit 20v. The drive circuit 20v turns on/off the boost switching element 3 in correspondence with the boost PWM pulses, and turns on/off the buck switching element 4 in correspondence with the buck PWM pulses. Accordingly, the secondary side voltage Vuc of the two-way converter circuit 1 is controlled by the secondary target voltage Vuc* or a value close thereto. Note that, in order to prevent the boost switching element 3 and the buck switching element 4 from being turned on simultaneously (an output short-circuit), a protection period (dead time) in which one is brought to a restrained off-level when the other is at an instructed on-level is set between the boost PWM pulse and the buck PWM pulse.

The microcomputer MPU of the motor control device 30m performs a feedback control for driving the electric motor by a vector control calculation on a known d-q axis model in the "output calculation" 35, with a d axis being in the direction of a pair of magnetic poles of the rotor of the electric motor 10*m* and a q axis being in the direction orthogonal to the d axis. Therefore, the microcomputer converts to digital and reads current detection signals iU, iV, and iW of the current sensors 14 to 16, and uses a three-phase/two-phase conversion as a known fixed/rotating coordinate system conversion to convert the three-phase current values iU, iV, and iW on a fixed coordinate system to two-phase current values id and iq of the d axis and the q axis on a rotating coordinate system by a current feedback calculation.

A first high efficiency torque curve table A as one look-up table is in the output calculation 35. In the first high efficiency torque curve table A, the d-axis current value id for generating the target torque T* at each motor speed associated with the motor speed ω and the motor target torque T* is written.

The output torque of the electric motor is determined in correspondence with each value of the d-axis current id and the q-axis current iq. However, an infinite number of combination of the d-axis current id and the q-axis current iq for outputting the same torque for one rotational speed value, i.e., at the same motor rotation speed, exist on a constant torque curve. On the constant torque curve, a combination of the d-axis current id and the q-axis current iq in which the electric power usage efficiency is maximum (electric power consumption is minimum) is a high efficiency torque point. A curve connecting a plurality of the high efficiency torque points on the torque curves is a high efficiency torque curve, which exists for each rotational speed. By energizing the electric motor 10*m* with the d-axis current id and the q-axis current iq in the position of the provided motor target torque T* on the high efficiency torque curve for the rotational speed of the motor as the target current values, the target torque T* is output by the electric motor 10*m*, and the electric power usage efficiency of the motor energization is high.

In this embodiment, the high efficiency torque curve is classified into two types of a first high efficiency torque curve A showing the value of the d axis and a second high efficiency torque curve B showing the value of the q axis. In addition, the first high efficiency torque curve A is in a pair to be applied respectively to a power running region and a regeneration region, both of which show a d-axis target current with respect to the motor rotation speed and the target torque.

The first high efficiency torque curve table A is a memory region assigned to the target torque T* in which the d-axis target current for generating the target torque with minimum electric power consumption is written, and is formed of one pair of a power running table A1 for power running and a regeneration table A2 for regeneration. Which one of the tables for power running and regeneration is to be used is determined in accordance with a result of identifying the power running or regeneration based on the rotational speed ω of the electric motor and the provided target torque T*.

Note that the counter-electromotive force generated in the stator coils 11 to 13 increases along with the increase of the rotational speed ω of the electric motor 10*m* to increase the terminal voltages of the coils 11 to 13. Accordingly, it becomes difficult to supply the target current to the coils 11 to 13 from an inverter 19, and a target torque output cannot be obtained. In this case, by reducing the d-axis current id and the q-axis current iq by Δid and Δiq along the constant torque curve of the provided motor target torque T*, the target torque T* can be output, although the electric power usage efficiency is reduced. This is called a weak field control. The d-axis weak field current Δid is generated by a field adjustment amount calculation to calculate a d-axis current instruction and to calculate a q-axis current instruction. The d-axis weak field current Δid is calculated by a weak field current calculation 41. The content thereof will be described below.

In the calculation of the d-axis current instruction in the "output calculation" 35, the microcomputer MPU subtracts the d-axis weak field current Δid from the d-axis current value id read from the first high efficiency torque curve table A in correspondence with the target torque T* determined by the torque instruction limitation 34 to calculate a d-axis target current id* as id*=−id−Δid.

In the calculation of the q-axis current instruction, a second high efficiency torque curve table B in the output calculation 35 is used. The second high efficiency torque curve table B stores data of a corrected second high efficiency torque curve B in which the second high efficiency torque curve B showing the value of the q axis in the high efficiency torque curve is further corrected to a curve showing a q-axis target current in which the d-axis weak field current Δid and the paired q-axis weak field current Δiq are subtracted. The second high efficiency torque curve table B is a memory region assigned to the target torque T* and the d-axis weak field current Δid in which the d-axis target current for generating the target torque with minimum electric power consumption, i.e., the target current value of the corrected second high efficiency torque curve B, is written, and is formed of one pair of a power running table B1 for power running and a regeneration table B2 for regeneration. Which one of the tables for power running and regeneration is to be used is determined in accordance with a result of identifying the power running or regeneration based on the rotational speed w of the electric motor and the provided target torque T*.

In the calculation of the q-axis current instruction, a q-axis target current iq* assigned to the target torque T* and the d-axis weak field current Δid is read from the second high efficiency torque curve table B as the q-axis current instruction.

The microcomputer MPU of the motor control device 30*m* uses the output calculation 35 to calculate a current deviation δid of the d-axis target current id* and the d-axis current id and a current deviation δiq of the q-axis target current iq* and the q-axis current iq, perform a proportional control and an integral control (PI calculation of the feedback control) based on the respective current deviations δid and δiq, and calculate a d-axis voltage instruction value vd* and a q-axis voltage instruction value vq* as output voltages.

In the weak field current calculation 41, a voltage saturation index m as a parameter for the weak field control is calculated. That is, a voltage saturation calculation value ΔV is calculated as a value showing the degree of voltage saturation based on the d-axis voltage instruction value vd* and the q-axis voltage instruction value vq*, and a field adjustment amount is calculated. In the calculation of the field adjustment amount, the ΔV is summed up, the d-axis weak field current Δid for performing the weak field control is calculated by multiplying the summed value ΣΔV by a proportionality constant to set a positive value in the case where the summed value ΣΔV takes a positive value, and the adjusted value Δid and the summed value ΣΔV are made zero in the case where the voltage saturation calculation value ΔV or the summed value ΣΔV is less than or equal to zero. The adjusted value Δid is used for the calculation of the d-axis current instruction and the calculation of the q-axis current instruction in the output calculation 35 described above.

Next, in a two-phase/three-phase conversion 36 which is a rotating/fixed coordinate system conversion, the target voltages vd* and vq* on the rotating coordinate system are converted to respective phase target voltages VU*, VV*, and VW* on the fixed coordinate system in accordance with the two-phase/three-phase conversion. These are sent to a PWM pulse generation 50 via a modulation 37 when the voltage control mode is in three-phase modulation. When the voltage control mode is in two-phase modulation, the respective phase target voltages VU*, VV*, and VW* in the three-phase modulation mode are converted to those of a two-phase modulation by the two-phase modulation of the modulation 37 and sent to the PWM pulse generation 50. When the voltage mode is in a 1 pulse mode in which all phases are energized by rectangular waves, the respective phase target voltages VU*, VV*, and VW* in the three-phase modulation mode are converted to respective phase voltages energizing with rectangular waves by 1 pulse modulation of the modulation 37, and provided to the PWM pulse generation 50.

When the three-phase target voltages VU*, VV*, and VW* are provided, the PWM pulse generation 50 performs conversion to PWM pulses MU, MV, and MW for outputting the voltages of respective values, and outputs the PWM pulses MU, MV, and MW to the drive circuit 20m shown in FIG. 1. The drive circuit 20m generates six drive signals in parallel based on the PWM pulses MU, MV, and MW, and turns on/off the transistors Tr1 to Tr6 of the voltage inverter 19m with the respective drive signals. Accordingly, the stator coils 11 to 13 of the electric motor 10m are applied with the VU*, VV*, and VW* to cause phase current iU, iV, and iW to flow. When the respective phase target voltages in the two-phase modulation mode are provided, a PWM pulse generator generates PWM pulses for two phases and leaves one phase as an on or off (constant voltage output) signal. The phase in the constant voltage of the on or off is switched sequentially. When the respective phase target voltages in the 1 pulse modulation mode is provided, the drive circuit 20m outputs energizing interval signals that energize the respective phases with rectangular waves.

Further, in the two-phase/three-phase conversion 36, an electric motor target voltage Vm* is calculated in the process of the two-phase/three-phase conversion. The calculation formula is Vm*=√(Vd*²+Vq*²). From the electric motor target voltage Vm* and the voltage Vuc of the secondary side capacitor 23 (voltage detection value of the voltage sensor 24), a modulation ratio Mi=Vm*NVuc*m is calculated in a modulation ratio calculation 43 of a modulation controller 42. In a modulation mode determination 44, the modulation mode is determined based on the modulation ratio Mi, the target torque T*, and the rotational speed ω of the electric motor 10m. In accordance with the determined modulation mode, the output of the respective phase target voltages in the modulation mode is instructed for a selection 40 in the modulation 37. In the selection 40, the respective phase target voltages VU*, VV*, and VW* are sent to the PWM pulse generation 50 via the modulation 37 when the modulation mode is in the three-phase modulation. When the modulation mode is in the two-phase modulation, the respective phase target voltages VU*, VV*, and VW* in the three-phase modulation mode are converted to those of the two-phase modulation by a two-phase modulation 38 of the modulation 37 and sent to the PWM pulse generation 50. When the modulation mode is in the 1 pulse mode in which all phases are energized by rectangular waves, the respective phase target voltages VU*, VV*, and VW* in the three-phase modulation mode are converted to respective phase voltages energizing with rectangular waves by 1 pulse conversion 39 of the modulation 37 and provided to the PWM pulse generation 50.

The microcomputer MPU shown in FIG. 2 includes a RAM, a ROM, and a flash memory for recording data and recording various programs in addition to a CPU. The program, reference data, and look-up table stored in the ROM or flash memory are written in the RAM, and the input process and the calculation/output process shown in a block of a chain double-dashed line in FIG. 2 are performed based on the program.

Figure 3:
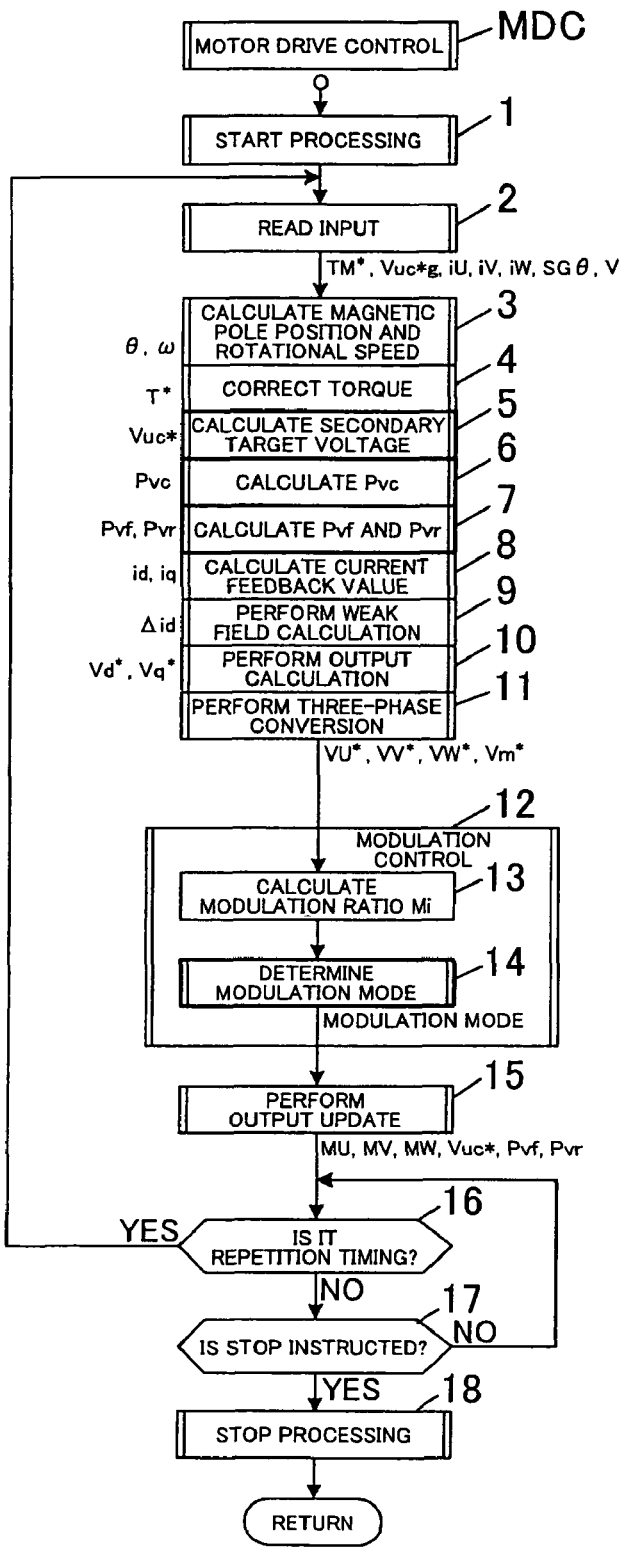
FIG. 3 is a flowchart showing the outline of a motor control of a microcomputer shown in FIG. 2.

FIG. 3 shows the outline of a motor drive control MDC executed by (the CPU of) the microcomputer MPU based on the program. When the operation voltage is applied, the microcomputer MPU performs initializing of itself, the PWM pulse generation 50, and the drive circuit 20m, and sets the inverter 19m, which drives the electric motor 10m to a stop, stand-by state. Then, the microcomputer MPU waits for a motor drive start instruction from the main controller of the vehicle drive control system (not shown). When the motor drive start instruction is provided, the microcomputer MPU sets a default value of the electric motor control in an internal register by a "start processing" (step 1), and reads an input signal or data in an "input read" (step 2). That is, a first target torque TM* provided by the main controller and the second target voltage Vuc*g provided by the motor control device 30g are read, and the respective phase current detection signals iU, iV, and iW detected by the current sensors 14m to 16m, the rotation angle signal SG θm of the resolver 17, and the secondary side voltage Vuc detected by the voltage sensor 24 are read by digital conversion.

Note that step numbers are shown in parentheses below with the word "step" being omitted.

Next, the microcomputer MPU calculates the rotation angle θ and the rotational speed ω of the electric motor 10m (3) based on the read rotation angle signal SG θm (rotation angle data SG θm). This function is shown as an angle/speed calculation 32 in FIG. 2. Next, the microcomputer MPU reads the limit torque TM*max corresponding to the read motor target torque TM*, the read secondary side voltage Vuc, and the calculated rotational speed ω from the limit torque table, and determines the limit torque TM*max as the target torque T* when the read motor target torque TM* exceeds the limit torque TM*max. When less than or equal to the limit torque TM*max, the read motor target torque TM* is determined as the target torque T* (4). This function is shown as the torque instruction limitation 34 in FIG. 2.

Next, the microcomputer MPU identifies whether the electric motor 10m is in "power running" operation or "regeneration" operation in a "secondary side target voltage calculation" (5), selects the group corresponding to the identification result, reads the first target voltage Vuc*m assigned to the present rotational speed ω from the first target voltage table associated with the target torque T* therein, and determines the higher one of the first target voltage Vuc*m and the second target voltage Vuc*g provided by the motor control device 30g as the second target voltage Vuc*. The content of the "secondary side target voltage calculation" (5) is the content of the secondary target voltage calculation 45 shown in FIG. 2 described above.

Next, the microcomputer MPU calculates the control output Pvc for bringing the secondary side voltage Vuc detected by the voltage sensor 24 to the secondary target voltage Vuc* by the feedback proportional-integral (PI) calculation in a "Pvc calculation" (6). In a "Pvf/Pvr calculation" (7), the control output Pvc is converted to on-duty data Pvf of boost PWM pulses which turn on/off the boost switching element 3 and on-duty data Pvr of buck PWM pulses which turn on/off the buck switching element 4. The "Pvc calculation" (6) has the content of the feedback control calculation 46 shown in FIG. 2, and the "Pvf/Pvr calculation" (7) corresponds to a duty signal conversion of the PWM pulse generation 47 shown in FIG. 2. The PWM pulse output corresponding to a duty signal of the PWM pulse generation 47 is performed by an output update in step 15.

Next, the microcomputer MPU converts the read current detection signals iU, iV, and iW of three phases to the d-axis current value id and the q-axis current value of two phases (8) by the three-phase/two-phase conversion. This function is shown in FIG. 2 as a current feedback 31. Next, the microcomputer MPU calculates the d-axis weak field current Δid for performing a d-axis weak field control (9). This function is shown as the weak field current calculation 41 in FIG. 2.

The content of an "output calculation" (10) is similar to the content of the output calculation 35 shown in FIG. 2 described above. The voltage target values Vd* and Vq* of the d-q axes calculated in the "output calculation" (10) are converted to the respective phase target voltages VU*, VV*, and VW* of the three-phase modulation mode (11). The electric motor target voltage Vm* is also calculated at this time. In a subsequent "modulation control" (12), the modulation ratio Mi is calculated (13), and the modulation mode is determined (14) based on the modulation ratio Mi, the target torque T*, the rotational speed ω, and the secondary side voltage Vuc. The content will be described later with reference to FIG. 4.

FIG. 9 shows the outline of the division of the modulation modes. In FIG. 9, the target torque T* and the rotational speed ω are shown as parameters, but there is the modulation ratio Mi as another parameter. In this embodiment, the output voltage of the converter circuit 1, i.e., the secondary side voltage Vuc is also a parameter for modulation mode switching. The microcomputer MPU has modulation threshold value tables (look-up tables) associated with the modulation modes (three-phase modulation, two-phase modulation, and 1 pulse). The respective modulation threshold value tables store a threshold value of a modulation mode boundary (the rotational speed ω associated with the target torque T* in this embodiment).

FIG. 9 shows the boundaries of a torque threshold value and a rotational speed threshold value corresponding to a modulation ratio boundary of a modulation-switching boundary. The torque threshold value and the rotational speed threshold value corresponding to the modulation ratio boundary in switching from the three-phase modulation mode to the two-phase modulation mode are shown by a solid line curve portion A and a chain double-dashed line portion Ao continuous therewith in FIG. 9. The torque threshold value and the rotational speed threshold value corresponding to the modulation ratio boundary in switching from the two-phase modulation mode to the three-phase modulation mode are shown by a dotted line curve portion B and a dotted line portion Bo continuous therewith in FIG. 9. However, in order to bring a region An where the electric noise given by the electric motor 10m to the resolver 17m is large also to the two-phase modulation, the torque threshold value and the rotational speed threshold value of that portion are changed to As (threshold value in changing from the three-phase modulation to the two-phase modulation) and Bs (threshold value in changing from the two-phase modulation to the three-phase modulation) to increase a two-phase modulation region. The increased specific regions are between As and Ao and between Bs and Bo.

A thin solid line C in FIG. 9 shows a switching threshold value from the two-phase modulation to the 1 pulse, and a thin dotted line D shows a switching threshold value from the 1 pulse to the two-phase modulation. A chain double-dashed line E shows the limit of the two-phase modulation. A switching threshold value (A, Ao) from the three-phase modulation to the two-phase modulation is a threshold value Ao on the higher side than the region An where the noise of the electric motor 10m with respect to the resolver 17m is stronger is a value shifted in a direction lower than the region An up to As. The threshold value herein is the rotational speed threshold value associated with the target torque. In a similar manner, the switching threshold value from the two-phase modulation to the three-phase modulation is a value shifted up to Bs. Accordingly, in the region An where the electric motor noise is strong in the three-phase modulation, the two-phase modulation with smaller noise is employed. Thus, disturbance in a rotation detection signal SG θ of the resolver 17m due to the electric motor noise is reduced, and the reliability of the drive control of the electric motor 10m is improved. Note that, in order to prevent frequent switching between the three-phase modulation and the two-phase modulation due to slight increase/decrease in the target torque T* or the rotational speed, with the threshold value Bs as a lower value than As, a margin is provided there between. That is, a hysteresis is provided in the switching of the modulation modes.

Figure 4:
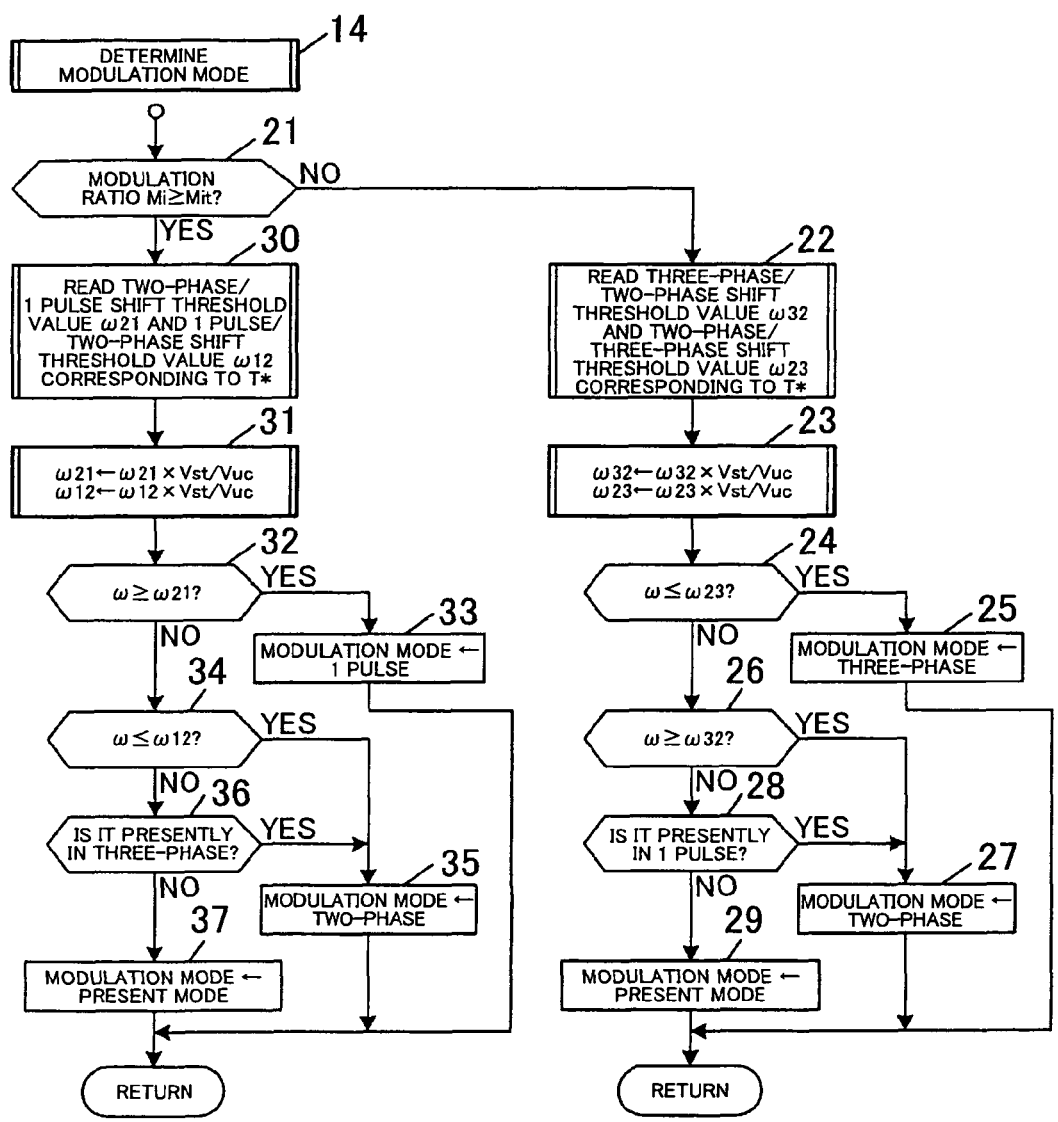
FIG. 4 is a flowchart showing the content of a "modulation mode determination" shown in FIG. 3.

FIG. 4 shows the content of a "modulation mode determination" (11). As the outline of this embodiment, the modulation mode is limited to the two-phase modulation or the 1 pulse mode when the modulation ratio Mi is less than a threshold value (fixed value) Mit, and limited to the three-phase modulation or the two-phase modulation when greater than or equal to the threshold value Mit. In the "modulation mode determination" (11), the microcomputer MPU reads from the modulation threshold value table a standard threshold value ω32 of the boundary in switching from the three-phase modulation to the two-phase modulation and a standard threshold value ω23 of the boundary in switching in an opposite manner which correspond to the present target torque T* (22) when the present modulation ratio Mi is less than the threshold value Mit. In order to reduce the threshold values ω32 and ω23 when the secondary side voltage Vuc is high, the respective threshold values are changed to values (reference threshold values) obtained by multiplying the respective threshold values by "Vst/Vuc" (23). Herein, Vst is a reference voltage, and Vuc is the output voltage of the converter 1, i.e., the secondary side voltage. An optimum modulation switching boundary value in the case where the secondary side voltage is Vst is written as the standard threshold value in the modulation threshold value table. By the threshold value change in step 23, the reference threshold value is changed to a low value when the present secondary side voltage Vuc is higher than the reference voltage Vst. When the secondary side voltage Vuc and the reference voltage Vst are equal, the threshold value is not changed.

The modulation mode is set to the three-phase modulation when the present rotational speed is less than or equal to the reference threshold value ω23 (24, 25), and is set to the two-phase modulation when greater than or equal to the reference threshold value ω32 (26, 27). If neither is the case, it is set to the two-phase modulation when the present modulation mode is the 1 pulse (28, 27), but maintains the present modulation mode when not in the 1 pulse (28, 29). That is, the present modulation mode is set as the modulation mode to be set in the next "output update" 15.

In the case where the present modulation ratio Mi is greater than or equal to Mit, a standard threshold value ω21 of the boundary in switching from the two-phase modulation to the 1 pulse modulation and a standard threshold value ω12 of the boundary in switching in an opposite manner which correspond to the present target torque T* are read from the modulation threshold value table (30). In order to reduce the threshold values ω21 and ω12 when the secondary side voltage Vuc is high, the respective threshold values are changed to values (reference threshold values) obtained by multiplying the respective threshold values by "Vst/Vuc" (31). The modulation mode is set to the 1 pulse modulation when the present rotational speed is greater than or equal to the reference threshold value ω21 (32, 33), and is set to the two-phase modulation when less than or equal to the reference threshold value ω12 (34, 35). If neither is the case, it is set to the two-phase modulation when the present modulation is the three-phase modulation mode (36, 35), but maintains the present modulation mode when not in the three-phase modulation (36, 37). That is, the present modulation mode is set as the modulation mode to be set in the next "output update" 15.

The first and second inverters 19m and 19g which drive the two electric motors 10m and 10g are connected to the one two-way converter circuit 1, and the secondary target voltage Vuc* of the converter is the higher one of the first target voltage Vuc*m necessary for driving the first electric motor 10m and the second target voltage Vuc*g necessary for driving the second electric motor 10g. Therefore, in most cases when the second electric motor 10g is in an electricity generation (regeneration) mode, the second target voltage Vuc*g necessary for the second inverter 19g which receives electricity from the second electric motor 10g is higher than the first target voltage Vuc*m necessary for the first inverter 19m which supplies electricity to the first electric motor 10m. That is, the secondary target voltage Vuc* (which equals Vuc*g) is higher than the first target voltage Vuc*m. Accordingly, there is a possibility of a spike current caused along with the PWM switching of the first inverter 19m increasing. However, in this case, in this embodiment, since the reference threshold value equals the standard threshold value multiplied by Vst/Vuc, and the reference threshold value in switching from the three-phase modulation to the two-phase modulation thereby decreases, it is switched from the three-phase modulation to the two-phase modulation at an early stage. Accordingly, a noise increase of the electric motor 10m due to the second target voltage Vuc*g higher than necessary being selected as the secondary target voltage Vuc* (Vuc) is suppressed, and the reliability of the drive control of the electric motor 10m is improved.

Returning to FIG. 3, the respective target voltages, calculated in the three-phase conversion (1), of the modulation mode determined in the modulation control (12) are output to the PWM pulse generation 50 in the "output update" (15). Also, the boost PWM pulse and buck PWM pulse of the duties Pvf and Pvr calculated in "Pvf, Pvr" (7) are output to the drive circuit 20v, and the secondary target voltage Vuc* is output to the second motor control device 30g.

Next, after waiting to become a next repetition processing timing (16), the process again proceeds to "input read" (2). Then, the processing of the "input read" (2) and after described above is executed. When a stop instruction is made from a system controller while the next repetition process timing is being waited, the microcomputer MPU stops the output for energizing motor rotation (17, 18).

The control functions of the motor control device 30m which controls the operation of the electric motor 10m for driving and rotating the wheel has been described above.

Returning to FIG. 1, the electric motor 10g as a second rotating electrical machine, which is driven to rotate by the engine on the vehicle, may be called an electric generator or an electric motor generator. In this embodiment, the electric motor 10g is an electric motor (for power running), which drives to start the engine at the start of the engine, and is an electric generator (for regeneration), which is driven to rotate by the engine to generate electricity when the engine is started. The function and operation of the second motor control device 30g, which controls the electric motor 10g, is similar to those of the motor control device 30m. The configuration and operation of the second inverter 19g, which supplies electricity to the electric motor 10g, is similar to those of the first inverter 19m. The configuration and function of the second motor control device 30g is similar to those of the first motor control device 30m. Note that, in this embodiment, the first motor control device 30m calculates the secondary target voltage Vuc* and controls the two-way converter circuit 1 (45 to 47 of FIG. 2 and steps 6 and 7 of FIG. 3), while the second motor control device 30g calculates the second target voltage Vuc*g but does not control the two-way converter 1.

A target torque TM*g of a positive value is provided from the main controller (not shown) to the second motor control device 30g when the engine is started, and the second motor control device 30g performs a motor control operation similar to the motor control operation described above of the first motor control device 30m. When the engine is started and the output torque thereof increases, the main controller switches the target torque TM*g to a negative value for electricity generation (regeneration). Accordingly, the second motor control device 30g controls the second inverter 19g such that the output torque of the second electric motor 10g becomes the target torque of the negative value (target load of the engine). The content (output calculation) is also similar to the output calculation described above of the first motor control device 30m.

Second Embodiment

Figure 5:
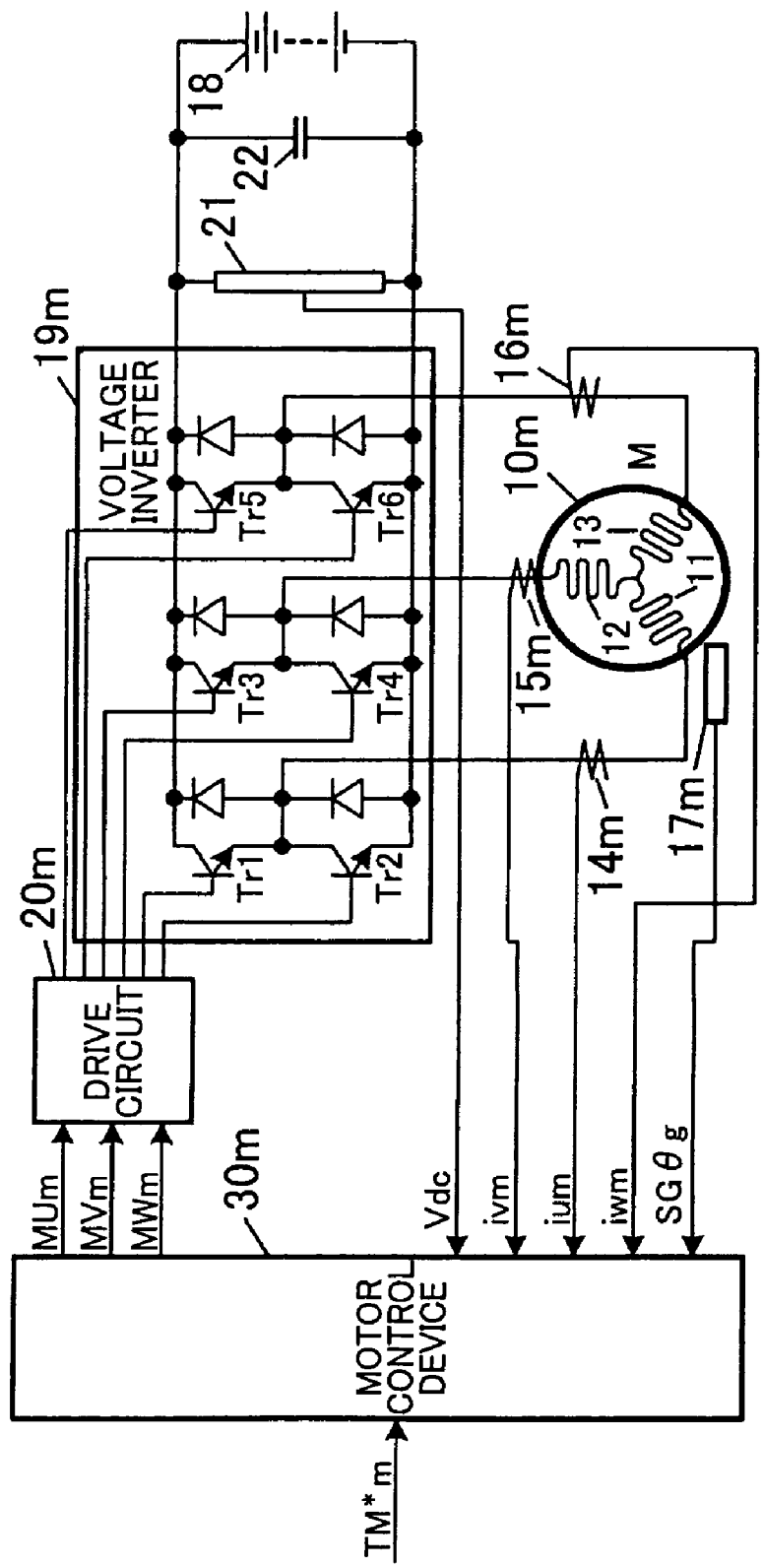
FIG. 5 is a block diagram showing the outline of the configuration of a second embodiment of the present invention.

FIG. 5 shows the outline of a second embodiment of the present invention. In this embodiment, the electric motor 10m as the rotating electrical machine subjected to control is a permanent magnet type synchronous electric motor mounted to the vehicle to drive and rotate the wheel, in which the rotor incorporates the permanent magnet and the stator has the three-phase coils 11 to 13 of a U-phase, a V-phase, and a W-phase. The voltage inverter 19m as the first inverter supplies the electric power of the battery 18 on the vehicle to the electric motor 10m. The rotor of the first resolver 17m for detecting the magnetic pole position of the rotor is connected to the rotor of the electric motor 10m. The resolver 17m generates the analog voltage (rotation angle signal) SG θm showing the rotation angle of the rotor to be provided to the motor control device 30m.

In the second embodiment, since there is no converter to increase and output the voltage of the primary side power supply 18 and 22 and a battery voltage Vdc is applied to the inverter, the input voltage of the inverter 19m is approximately constant. That is, the input voltage of the inverter 19m does not fluctuate to a great degree unlike the secondary side voltage Vuc of the first embodiment, and the input voltage of the inverter 19m is the battery voltage Vdc, and can be viewed as constant when compared with the fluctuation.

Figure 6:
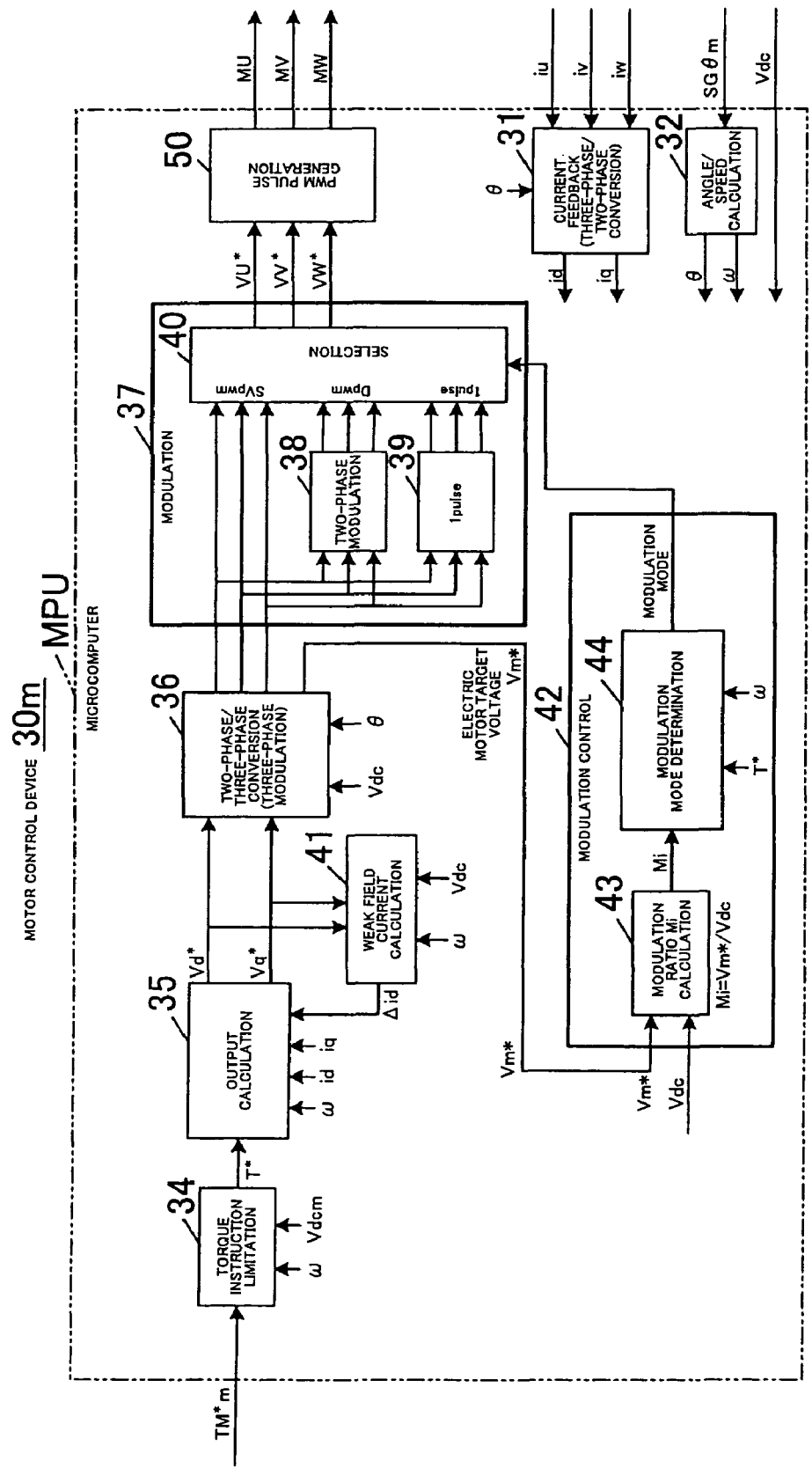
FIG. 6 is a block diagram showing the outline of the functional configuration of the motor control device shown in FIG. 5.

FIG. 6 shows the functional configuration of the motor control device 30m shown in FIG. 5. Since this configuration does not use the two-way converter, the converter control portions (45 to 47) of the motor control device (FIG. 2) of the first embodiment are omitted. In the torque instruction limitation 34, the limit torque TM*max corresponding to a maximum voltage Vdcm (fixed value) which can be output by the battery 18 and the rotational speed ω is read from the limit torque table (look-up table), and the limit torque TM*max is determined as a target torque T* when the target torque TM* exceeds the limit torque TM*max. When less than or equal to the limit torque TM*max, the motor target torque TM* is determined as the target torque T*. The motor target torque T* generated with such limitation is applied to the output calculation 35.

In the second embodiment, the power supply voltage (battery voltage) Vdc is detected by a voltage sensor 21, by referring to the power supply voltage Vdc, the d-axis weak field current Δid in the weak field current calculation 41 is calculated, and the respective target voltages VU*, VV*, and VW* are calculated based on the power supply voltage Vdc in the two-phase/three-phase conversion 36.

Figure 7:
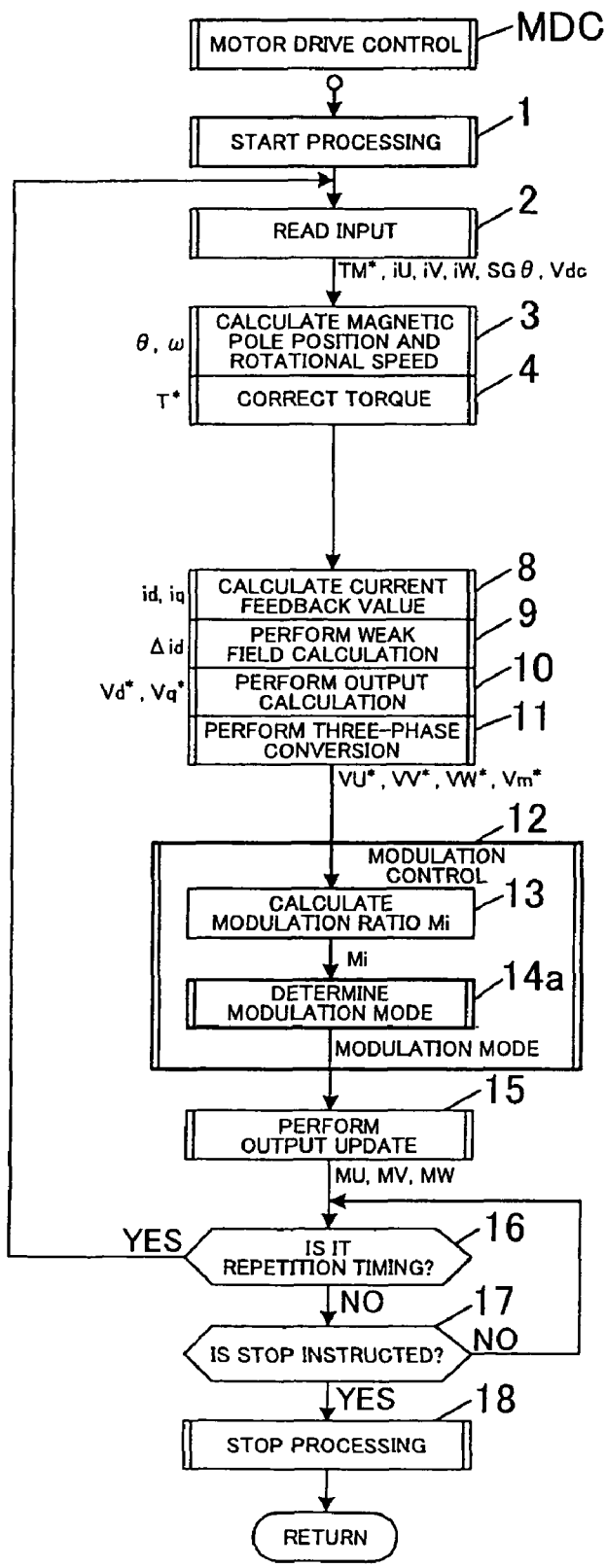
FIG. 7 is a flowchart showing the outline of the motor control of the microcomputer shown in FIG. 6.

FIG. 7 shows the outline of the motor drive control MDC executed by (the CPU of) the microcomputer MPU forming the motor control device 30m of the second embodiment. The processing from the second target voltage calculation 35 to the Pvf/Pvr calculation 7 of the first embodiment is omitted, and the modulation mode determination 14 in the modulation control 12 is changed to a "modulation mode determination" 14a associated with the battery voltage Vdc in which the inverter input voltage can be deemed approximately constant.

Figure 8:
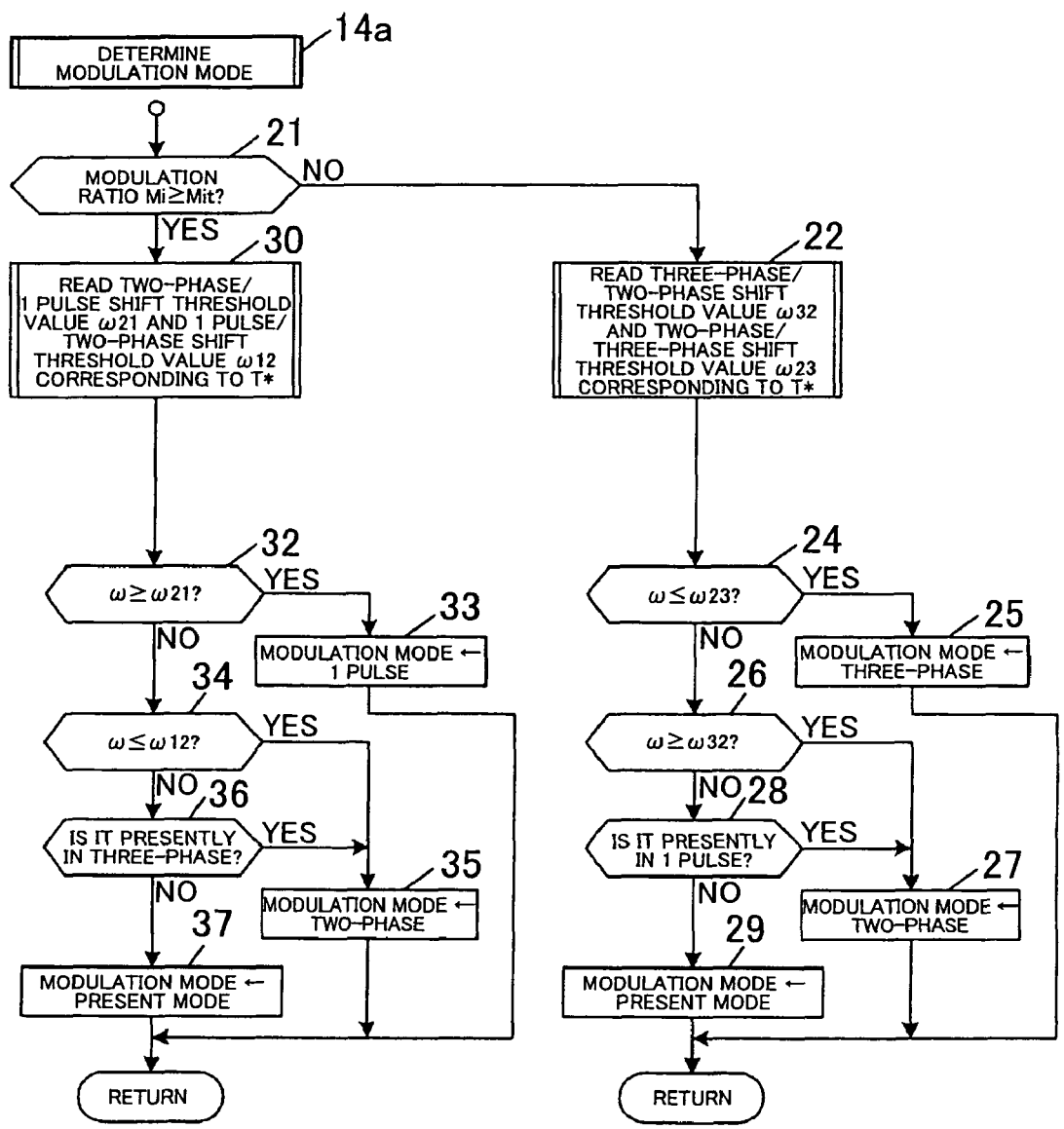
FIG. 8 is flowchart showing the content of a "modulation mode determination" shown in FIG. 7.

FIG. 8 shows the content of the "modulation mode determination" 14a. Since the inverter input voltage is the battery voltage (approximately constant), the processing steps 23 and 31 for correcting the modulation mode-switching boundary (threshold value) in correspondence with the inverter input voltage Vuc of the first embodiment (FIG. 4) are omitted. The outline of the modulation mode division of the second embodiment is similar to that shown in FIG. 9. However, since the input voltage of the inverter 19m in the second embodiment is not the boost voltage but the battery voltage, the threshold value of the modulation region boundary takes a different value from that of the first embodiment.

Other configurations and functions of the second embodiment are similar to those of the first embodiment described above (FIGS. 1 to 4). Also in the second embodiment, a three-phase/two-phase switching boundary A, As, which is the switching boundary A, Ao from the three-phase modulation to the two-phase modulation being shifted to the low target torque and low rotational speed side of the region An of high torque and high rotational speed in which the electric noise given to the resolver 17m by the electric motor 10m is strong, is used to switch to the two-phase modulation when the target torque and the rotational speed exceed the boundary A, As while the three-phase modulation is in execution. Therefore, it is automatically switched to the two-phase modulation when the target torque and the rotational speed of the rotating electrical machine are in the region An of the high torque and high rotational speed in which the electric noise is strong in the three-phase modulation. Accordingly, the number of PWM switching by the inverter decreases to reduce the noise occurrence of the rotating electrical machine, whereby the possibility of the rotation detection signal of the resolver being disturbed correspondingly decreases to improve the reliability of the rotating electrical machine drive control.

Note that, in both the first embodiment and the second embodiment described above, the specific region (As to Ao and As' to Ao') is made greater at the time of power running than at the time of regeneration (As' to Ao'), as shown in FIG. 9. In the case where the torque and the rotational speed are the same, greater current (modulation ratio) is necessary at the time of power running than at the time of regeneration. The motor current is converted to the torque in order of the motor current, the inverter (loss), the motor (loss), and the torque at the time of the power running, while the torque is converted to the motor current in order of the torque, the motor (loss), the inverter (loss), and the motor current at the time of regeneration. In the case where the torque is made the same at the time of the power running and at the time of regeneration, higher motor current corresponding to the addition of the inverter loss and the motor loss is necessary at the time of the power running, whereas the motor current generated by the regenerative torque at the time of regeneration is lower corresponding to the motor loss and the inverter loss. Therefore, the motor current is greater at the time of the power running than at the time of regeneration when the torque and rotational speed are the same. The amount of resolver noise tends to increase in proportion to the motor current (modulation ratio). That is, the specific region increases. In the first and second embodiments, taking this into consideration, the specific region is made greater at the time of the power running than at the time of regeneration of the rotating electrical machine.

In one modified example of the embodiments, the motor control devices 30m and 30g perform the switching to the two-phase modulation when the torques and rotational speeds of the electric motors 10m and 10g are in the specific region (As to Ao or As' to Ao'), but not at the time of regeneration. As described above, in the case where the torque is made the same at the time of the power running and at the time of regeneration, higher motor current corresponding to the addition of losses of the inverter and the motor becomes necessary at the time of the power running, while the motor current generated by the regenerative torque at the time of regeneration becomes lower corresponding to the losses of the motor and the inverter. Thus, the resolver noise in the specific region (As' to Ao') at the time of regeneration is small. In switching from the three-phase modulation to the two-phase modulation in the specific region, the current distortion occurs to no small extent since the region preferably controlled in the three-phase modulation is controlled in the two-phase modulation. This is taken into consideration in this modified example, and the switching to the two-phase modulation in the specific region (As' to Ao') is not performed at the time of regeneration in which the necessity for a measure against the resolver noise is low to avoid an increase in the current distortion. In another modified example, the specific region (As' to Ao') at the time of regeneration is omitted. That is, the specific region is limited to only the specific region (As to Ao) at the time of regeneration.

According to an exemplary aspect of the invention, since a switch occurs to the two-phase modulation in the specific region where the electric noise given to the resolver by the rotating electrical machine is large, there is an automatic switch to the two-phase modulation when the target torque and the rotational speed of the rotating electrical machine are in the region of high torque and high rotational speed where the electric noise is strong in the three-phase modulation. Accordingly, the number of PWM switching of the inverter decreases to reduce the noise occurrence of the rotating electrical machine, whereby the possibility of the rotation detection signal of the resolver being disturbed correspondingly decreases to improve the reliability of the rotating electrical machine drive control.

According to an exemplary aspect of the invention, there is a switch to the two-phase modulation in the specific region where the torque threshold value and the rotational speed threshold value lower than the torque and the rotational speed of the rotating electrical machine corresponding to the three-phase/two-phase modulation switching boundary are exceeded and the electric noise given to the resolver by the rotating electrical machine is large, even in a three-phase modulation region where the modulation ratio is smaller than the three-phase/two-phase modulation switching boundary. Therefore, it is automatically switched to the two-phase modulation when the target torque and the rotational speed of the rotating electrical machine are in the region of high torque and high rotational speed where the electric noise is strong in the three-phase modulation. Accordingly, the number of PWM switching of the inverter decreases to reduce the noise occurrence of the rotating electrical machine, whereby the possibility of the rotation detection signal of the resolver being disturbed correspondingly decreases to improve the reliability of the rotating electrical machine drive control.

According to an exemplary aspect of the invention, in the case where the torque and the rotational speed are the same, greater current (modulation ratio) is necessary at the time of power running than at the time of regeneration. The motor current is converted to the torque in order of the motor current, the inverter (loss), the motor (loss), and the torque at the time of the power running, while the torque is converted to the motor current in order of the torque, the motor (loss), the inverter (loss), and the motor current at the time of regeneration. In the case where the torque is made the same at the time of the power running and at the time of regeneration, higher motor current corresponding to the addition of the inverter loss and the motor loss is necessary at the time of the power running, whereas the motor current generated by the regenerative torque at the time of regeneration is lower corresponding to the motor loss and the inverter loss. Therefore, the motor current is greater at the time of the power running than at the time of regeneration when the torque and rotational speed are the same. The amount of resolver noise tends to increase in proportion to the motor current (modulation ratio). That is, the specific region increases. In this embodiment, taking this into consideration, the specific region is made greater at the time of power running than at the time of regeneration of the rotating electrical machine. Therefore, the noise occurrence of the rotating electrical machine at the time of power running can sufficiently be reduced.

According to an exemplary aspect of the invention, in the case where the torque is made the same at the time of the power running and at the time of regeneration, higher motor current corresponding to the addition of the losses of the inverter and the motor is necessary at the time of the power running, whereas the motor current generated by the regenerative torque at the time of regeneration is lower corresponding to the losses of the motor and the inverter. Thus, the resolver noise in the specific region at the time of regeneration is small. In switching from the three-phase modulation to the two-phase modulation in the specific region, a current distortion occurs to no small extent since the region preferably controlled in the three-phase modulation is controlled in the two-phase modulation. In this embodiment, in consideration of this, the specific region is not set and the switching to the two-phase modulation in the specific region is not performed at the time of regeneration in which the necessity for a measure against the resolver noise is low to avoid an increase in the current distortion.

According to an exemplary aspect of the invention, there is provided a two-way converter which increases the voltage of the primary side DC power supply to be supplied to the inverter. When the boost voltage, i.e., the secondary side voltage, increases, a spike current generated along with the PWM switching of the inverter increases, and there is a high possibility of the noise of the rotating electrical machine increasing. However, since the threshold value torque in switching from the three-phase modulation to the two-phase modulation is reduced to increase the specific region, it is automatically switched to the two-phase modulation at an early stage when the secondary side voltage is high to reduce the noise occurrence of the rotating electrical machine and further improve the reliability of the rotating electrical machine drive control.

According to an exemplary aspect of the invention, when the secondary side voltage increases, the spike current generated along with the PWM switching of the inverter increases. When the higher one of the first and second target voltages is selected as the secondary side target voltage and the secondary side voltage is controlled to become this voltage, the inverter which supplies electricity to the rotating electrical machine which is not selected performs PWM switching of a voltage higher than necessary, and there is a high possibility of the noise of the rotating electrical machine increasing. However, since the threshold value torque in switching from the three-phase modulation to the two-phase modulation is reduced to increase the specific region, it is automatically switched to the two-phase modulation at an early stage when the secondary side voltage is high to reduce the noise occurrence of the rotating electrical machine and further improve the reliability of the rotating electrical machine drive control.

According to an exemplary aspect of the invention, when the secondary side voltage is high, the control of the first inverter is automatically switched to the two-phase modulation at an early stage to reduce the noise occurrence of the first rotating electrical machine and further improve the reliability of the rotating electrical machine drive control.

According to an exemplary aspect of the invention, when the secondary side voltage is high, the control of the second inverter is automatically switched to the two-phase modulation at an early stage to reduce the noise occurrence of the second rotating electrical machine and further improve the reliability of the rotating electrical machine drive control.

What is claimed is:

1. A rotating electrical machine control device comprising:
   an inverter that performs electric power conversion between a primary side DC power supply and a rotating electrical machine;
   a resolver that generates a rotation detection signal corresponding to a rotation angle of the rotating electrical machine;
   a unit that calculates the rotation angle and a rotational speed based on the rotation detection signal;
   a three-phase/two-phase modulation switching unit that uses a target torque, the rotational speed and the rotation angle of the rotating electrical machine in order to control the inverter such that an output torque of the rotating electrical machine becomes the target torque and switches a control of the inverter from three-phase modulation to two-phase modulation when a modulation ratio, which is a ratio of a voltage applied to the rotating electrical machine with respect to a voltage input to the inverter, becomes greater than a three-phase/two-phase modulation switching boundary; and
   a motor control unit that switches to the two-phase modulation in a specific region where an electric noise given to the resolver by the rotating electrical machine is large, even in a region where the modulation ratio is smaller than the three-phase/two-phase modulation switching boundary.

2. The rotating electrical machine control device according to claim 1, wherein the motor control unit switches to the two-phase modulation in a specific region where a rotational speed threshold value lower than the rotational speed of the rotating electrical machine corresponding to the three-phase/two-phase modulation switching boundary is exceeded, a predetermined torque threshold value is exceeded, and the electric noise given to the resolver by the rotating electrical machine is large, even in the region where the modulation ratio is smaller than the three-phase/two-phase modulation switching boundary.

3. The rotating electrical machine control device according to claim 2, wherein the specific region is greater at a time of power running than at a time of regeneration of the rotating electrical machine.

4. The rotating electrical machine control device according to claim 2, wherein the specific region is set only at a time of power running and is not set at a time of regeneration of the rotating electrical machine.

5. The rotating electrical machine control device according to claim 1, wherein the specific region is greater at a time of power running than at a time of regeneration of the rotating electrical machine.

6. The rotating electrical machine control device according to claim 1, wherein the specific region is set only at a time of power running and is not set at a time of regeneration of the rotating electrical machine.

7. The rotating electrical machine control device according to claim 1, further comprising:
   a converter that increases a voltage of the primary side DC power supply to be supplied as a secondary side voltage to the inverter, and decreases a voltage of regenerative electric power from the inverter to be reversely supplied to the primary side DC power supply;
   a secondary side target voltage determination unit that obtains a secondary side target voltage corresponding to the target torque and the rotational speed of the rotating electrical machine; and
   converter control units that control the converter such that the secondary side voltage becomes the secondary side target voltage;
   wherein the motor control unit uses the target torque, the rotational speed, the rotation angle, and the secondary side target voltage to control the inverter such that the output torque of the rotating electrical machine becomes the target torque and reduces a threshold value torque in switching from the three-phase modulation to the two-phase modulation as the secondary side voltage increases to increase the specific region.

8. The rotating-electrical machine control device according to claim 7, wherein:
   the inverter includes:
      first and second inverters that control an exchange of electric power between first and second rotating electrical machines;
   the resolver includes:
      a first resolver that generates a rotation detection signal corresponding to a rotation angle and a rotational speed of the first rotating electrical machine, and
      a second resolver that generates a rotation detection signal corresponding to a rotation angle and a rotational speed of the second rotating electrical machine;
   the unit that calculates the rotation angle and the rotational speed includes:
      a first unit that calculates the rotation angle and the rotational speed of the first rotating electrical machine based on the rotation detection signal of the first resolver, and
      a second unit that calculates the rotation angle and the rotational speed of the second rotating electrical machine based on the rotation detection signal of the second resolver;
   the secondary side target voltage determination unit includes:
      a first secondary side target voltage determination unit that obtains a first target voltage corresponding to the rotational speed of the first rotating electrical machine based on a secondary side target voltage characteristic assigned to the target torque of the first rotating electrical machine and corresponding to the rotational speed,
      a second secondary side target voltage determination unit that obtains a second target voltage corresponding to the rotational speed of the second rotating electrical machine based on a secondary side target voltage characteristic assigned to the target torque of the second rotating electrical machine and corresponding to the rotational speed, and
      a third unit that sets a higher one of the first and second target voltages as the secondary side target voltage;
   the three-phase/two-phase modulation switching unit includes:
      a first three-phase/two-phase modulation switching unit that controls the first inverter and switches a control of the first inverter from the three-phase modulation to the two-phase modulation when a first modulation ratio, which is a ratio of a voltage applied to the first rotating electrical machine with respect to a voltage input to the first inverter, becomes greater than a first three-phase/two-phase modulation switching boundary, and
      a second three-phase/two-phase modulation switching unit that controls the second inverter and switches a control of the second inverter from the three-phase modulation to the two-phase modulation when a second modulation ratio, which is a ratio of a voltage applied to the second rotating electrical machine with respect to a voltage input to the second inverter, becomes greater than a second three-phase/two-phase modulation switching boundary; and
   the motor control unit includes:
      a first motor control unit that switches to the two-phase modulation in a first specific region where a first torque threshold value and a first rotational speed threshold value lower than a torque and the rotational speed of the first rotating electrical machine corresponding to the first three-phase/two-phase modulation switching boundary are exceeded and an electric noise given to the first resolver by the first rotating electrical machine is large, even in a three-phase modulation region where the first modulation ratio is smaller than the first three-phase/two-phase modulation switching boundary, and
      a second motor control unit that switches to the two-phase modulation in a second specific region where a second torque threshold value and a second rotational speed threshold value lower than a torque and the rotational speed of the second rotating electrical machine corresponding to the second three-phase/two-phase modulation switching boundary are exceeded and an electric noise given to the second resolver by the second rotating electrical machine is large, even in a three-phase modulation region where the second modulation ratio is smaller than the second three-phase/two-phase modulation switching boundary.

9. The rotating electrical machine control device according to claim 8, wherein the first motor control unit reduces the first torque threshold value to increase a region of the two-phase modulation as the secondary side voltage increases.

10. The rotating electrical machine control device according to claim 8, wherein the second motor control unit reduces the second torque threshold value to increase a region of the two-phase modulation as the secondary side voltage increases.

* * * * *